Patented Aug. 17, 1937

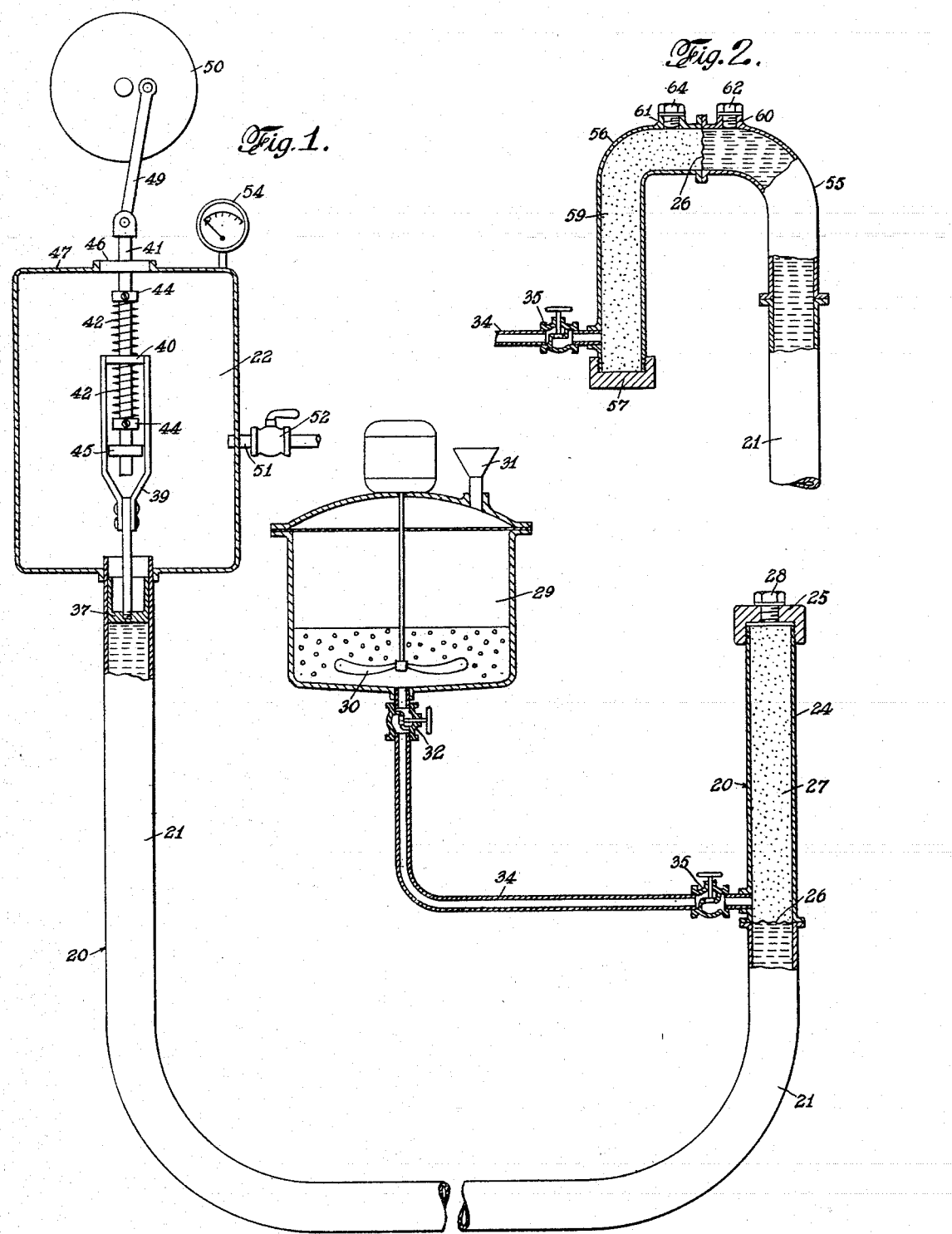

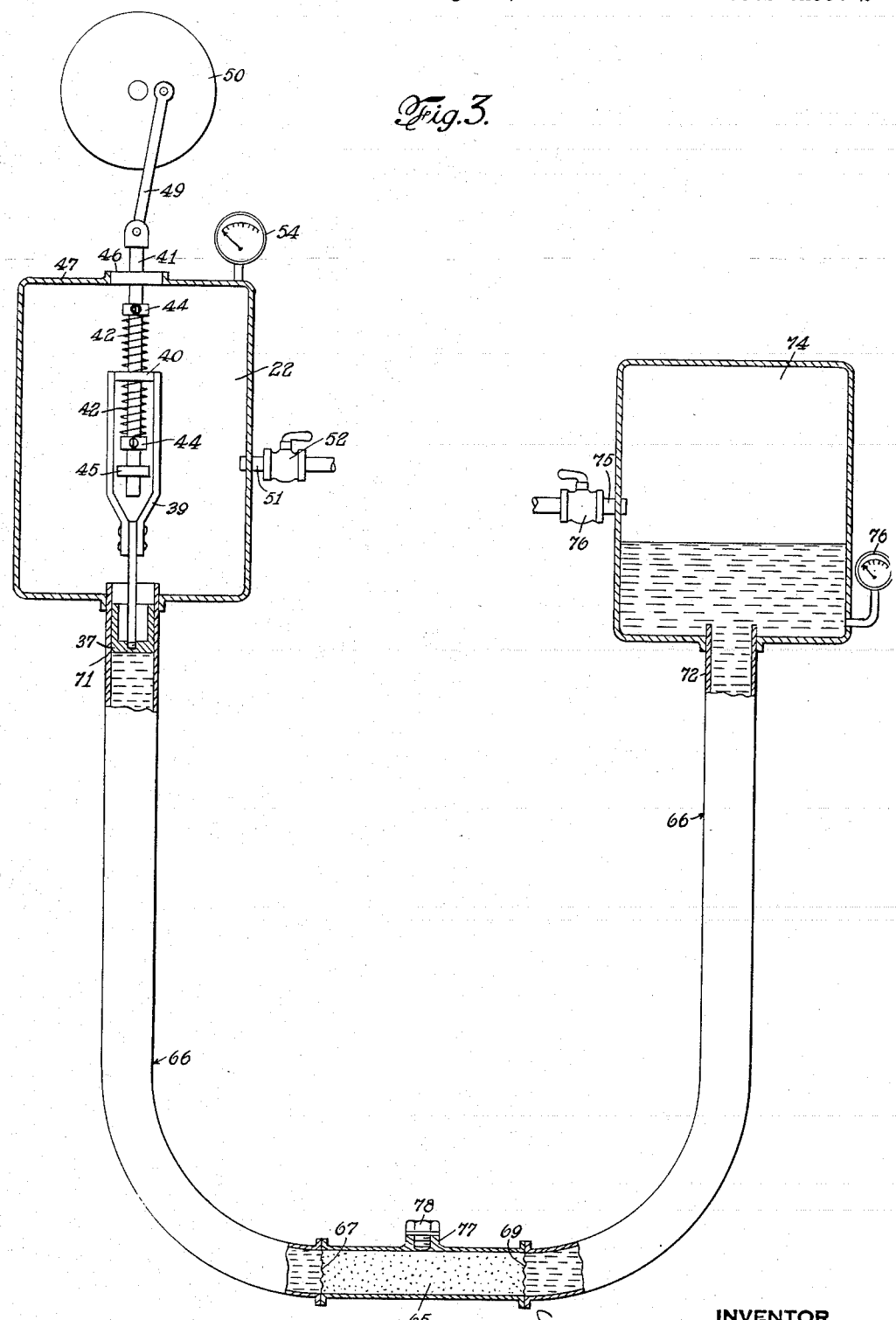

2,090,496

UNITED STATES PATENT OFFICE 2,090,496

APPARATUS FOR PRODUCING SUSPENSIONS

Samuel Joseph Wynn, New York, N. Y., assignor to Colloid Corporation, Baltimore, Md., a corporation of Maryland Application August 17, 1934, Serial No. 740,355

11 Claims. (Cl. 259—95)

The present invention relates to novel apparatus for producing suspensions, it being understood that the term "suspension" as used herein should be taken to mean a composition of matter comprising subdivided particles or micells of one or more substances in one or more other substances, which subdivided particles or micells are larger than molecular in size and either colloidal or larger than colloidal in size.

The general object of the invention is to provide apparatus for producing suspensions, which will effect extremely fine subdivision of the matter to be dispersed in the outer phase.

The invention will be understood with the aid of the following description taken in connection with the accompanying drawings in which Fig. 1 is a view, partly in section, of an apparatus embodying the invention; Fig. 2 is a fragmental view, partly in section, of a modification of the form of apparatus appearing in Fig. 1; and Fig. 3 is a view, partly in section, of still another apparatus embodying the invention.

Certain types of suspensions and particularly emulsions, as made by existing methods, have lacked one most desirable property. They cannot be diluted to any useful extent. That is, material of the outer phase or of the character of the outer phase cannot be added to produce dilution in the proportions often desired. This limitation is necessitated by the very nature of these suspensions. The protective colloid or peptizing agent required by current methods is generally soluble in the material required for dilution or may be peptized by such material with the result that, if dilution is carried beyond a certain limit, a breakdown or separation of phases takes place. Obviously, other means of securing stability must be sought if it is desired to adjust the ratio of inner to outer phases of such suspensions subsequently to their preparation. One such means would be to so reduce particle size of the inner phase that Brownian motion and the forces of surface energy may supplant entirely or in part the function of protective colloids or peptizing agents in achieving to a practical degree both stability and dilution.

It has been discovered that when fluctuating pressure is applied to two contacting substances under conditions of resonance, one will be thrown into an extremely fine state of dispersion into the other, provided of course, the substances are of such nature as to permit their admixture in this manner. Thus, matter in either liquid form or solid particle form may, by this novel treatment, be dispersed with great effectiveness in an outer liquid phase. No protective colloids nor disintegrating substances are required for assisting the dispersion and yet the resulting suspensions exhibit true colloidal properties. For example, a Tyndall light cone can be formed therein by using a proper lens and light source. Also, a microscopic inspection with direct illumination will show an absolutely clear field up to 900 diameters, but with a dark field condenser at open diaphragm position will show a few particles with the field exhibiting luminescence. In the ultramicroscope a profuse dispersion of particles in active Brownian movement is found with particle sizes ranging from $0.2\mu$ to limits of visibility in such device. Such suspensions can be diluted to any desired extent. Dilution of a given specimen into optically clear distilled water to the extent of 2 parts of specimen to 1,000,000 parts of water will still produce a definite light cone, whereas none is in evidence in the water prior to admixture of the specimen therewith.

In each of the embodiments of the invention illustrated and to be presently described, the conditions of resonance necessary to carry out the aforesaid treatment are attained by the use of a liquid column part of which is formed by the bodies employed for producing the suspensions contemplated, it being understood that the latter always have their outer phase constituents composed of liquid matter.

Referring to Fig. 1, a U-shaped pipe 20 is provided which is preferably made in two sections, namely a main section 21 communicating with a pressure chamber 22 and a shorter end section 24 carrying a closing cap 25 screwthreaded thereto. As shown, these sections are flanged at their meeting ends so that they may be firmly secured to one another with a flexible diaphragm or interior partition 26 held between them, the section 24 forming with the diaphragm 26 and cap 25 a chamber 27 wherein treatment of the constituents of the suspensions contemplated is effected. The section 21 is filled with water or some other fluid medium of high elasticity and low viscosity, it being important that no air space be left beneath the diaphragm 26, which may be accomplished by filling the section 21 in part prior to its connection to the section 24. The diaphragm 26 is so designed as not to interfere with the setting up of the desired resonance conditions in the pipe. It should be made of thin metal or other relatively incompressible material. Both sections 21 and 24 and the cap 25 should be of massive construction, the cap 25 being formed with a screw-threaded opening into which a plug or machine screw 28 is removably fitted. The pipe as a whole should be adequately braced to a suitable foundation (not shown), preferably throughout its length.

The bodies to undergo treatment should be introduced into the chamber 27 in a state of preliminary admixture, which may be effected in any well-known manner. Thus a chamber 29 is illustrated, wherein the bodies may be caused to undergo preliminary agitation by a motor driven propeller 30, a funnel 31 and an outlet valve 32 being provided through which the bodies may be respectively introduced into the chamber 29 and withdrawn therefrom. As shown, a pipe or conduit 34 is connected at one end to the valve 32 and at the other to another valve 35 located close to the treating chamber 27 and communicating therewith. With valves 32 and 35 in open position, the bodies are introduced, after their preliminary admixture in the chamber 29, through the conduit 34 into the treating chamber 27, the plug 28 being preliminarily removed to permit escape of air from the chamber 27 as the bodies rise therein. The chamber 27 should be completely filled, whereupon the plug 28 is restored and the valve 35 closed. The valve 35 acts to separate the bodies under treatment in the chamber 27 from the bodies in the conduit 34, this being desirable in view of the fact that the treatment can only take place effectively in the chamber 27. For the successful operation of the apparatus, it is essential that there be no pressure releases.

The liquid in the pipe 20 (including the section 24) is set in vibration by a plunger 37 at the open end of the section 21, to which plunger 37 oscillatory motion may be imparted by any suitable means. In the embodiment illustrated, a fork 39, to which the plunger 37 is attached, extends into the pressure-chamber 22 and carries a cross-bar 40 which is centrally apertured for sliding movement on a driving rod 41. On either side of the bar 40, a spiral spring 42 is mounted on the rod 41, each spring resting at its outer end against a collar 44 adjustably clamped to the rod 41 and at its inner end against the bar 40. The driving rod 41 is guided for vertical movement by a bearing 45 suitably supported inside the chamber 22 and by a bearing and packing-gland 46 provided in the upper wall 47 of the chamber 22. The rod 41 is given a reciprocating motion through the medium of a connecting-rod 49 pivotally connected at one end to the upper end of the rod 41 and at the other to a crank pin attached to a fly-wheel 50, which is adapted to be rotated at an adjustable speed by any suitable means, as by a motor (not shown). This system of drive allows the piston 37 to take on an amplitude of motion determined by the driving force transmitted through the springs 42 and by the opposition to the motion offered by the liquid in the pipe 20. If the piston were rigidly connected to the driving rod 41, this adaptability to the opposition offered by the liquid could not be obtained with the result that it might be difficult to start the motor or to run it at a speed different from that corresponding to the natural period of vibration of the liquid in the pipe 20 including the section 24. Suitable air pressure is supplied to the chamber 22 through a nipple 51 screw-threaded into one of the side walls of said chamber, which nipple 51 is provided with an exterior valve 52, subsequent closure of which prevents release of the applied pressure. As shown, the chamber 22 is also provided with a pressure gage 54.

The operation of the liquid-filled pipe 20 (including the section 24) is analogous to the operation of an organ pipe closed at one end, the vibrations of the liquid being substantially of the character of sound waves in the liquid. The natural period of vibration of the liquid is determined by its physical characteristics and by the length of the liquid column in the pipe. Conditions of resonance are effected by adjusting the speed of the flywheel 50 to cause the frequency of oscillatory movement of the piston 37 to equal the natural frequency of vibration of the liquid column. Under such conditions, minimum amount of pressure is exerted upon the piston 37 by the liquid. Thus, the pressure in the vicinity of the piston 37, where the velocity is maximum, will be substantially constant and substantially equal to the pressure maintained inside the chamber 22, whereas in the region contiguous to the closing cap 25 (i. e., in the treating chamber 27), where the velocity is minimum, there will be developed a high fluctuating pressure. The pressure at the cap 25 may fluctuate between a lower limit of practically zero pressure (absolute) and an upper limit substantially twice the static pressure which is maintained in the chamber 22. It is this fluctuating pressure effected in the treating chamber 27 under conditions of resonance, which acts to disintegrate or comminute the inner matter in the outer liquid phase. It is not essential that pressure be maintained in the chamber 22. That is, fluctuating pressure will be developed in the treating chamber 27 with the chamber 22 open to the atmosphere (valve 52 in open position).

The resonant frequency of the liquid column in the pipe 20 (closed at one end by the cap 25) is such that the length of the column is approximately one-quarter of the wave length of sound in water or whatever liquid may be used at that frequency. This is only approximately true, however, because of the following modifying factors. The mass of the piston 37 and fork 39 will tend to slightly lower the resonant frequency of the liquid column. Also, there must necessarily be a small amount of give or yield to the walls of the containing pipe 20, which yield will also result in a slight lowering of the resonant frequency. These factors will have no detrimental effect upon the operation of the apparatus, however, provided the pipe 20 (and cap 25) be made fairly rigid. The piston 37 and fork 39 should be of comparatively light construction.

Care must also be taken in arranging the form of the driving piston 37. In the case of an organ pipe the contained air column is set into vibration by a vibratory reed and a blast of air blown across the mouth of the pipe, the fluid medium outside the pipe being the same as that inside the pipe, namely, air. In the case of the pipe 20, however, a surface of discontinuity will exist even if the liquid in the pipe section 21 comes to its upper edge. Assuming a small piston (much smaller than the piston 37 indicated) be set in vibration at or somewhat below the surface of the liquid under those conditions, the liquid at the surface of discontinuity will be unable to take on the type of vibration occurring in the organ pipe and will be thrown into violent agitation with consequent loss of energy, thereby upsetting the resonant conditions.

This difficulty may be overcome in various ways, one of which is indicated in Fig. 1. The piston 37 is made fairly long and of a diameter such that there is very small clearance between the piston and the wall of the pipe section 21. With the piston 37 at rest and in the middle position of its stroke, the liquid in the pipe section 21 is then adjusted to a level half way up the height of the piston. When the piston 37 is set into oscillatory motion, there will be little spattering of the liquid above the piston because of the narrowness of the annular space between piston and wall of the pipe section 21. When the piston 37 has been brought up to resonant frequency, the liquid tends to move in substantially the same manner as the piston. That is, the liquid and piston then swing back and forth together, there being little tendency for random motion of the liquid.

Another successful method of drive involves filling the pipe section 21 and the lower part of the chamber 22 with liquid. Conditions are then roughly somewhat the same as those obtained in the case of an organ pipe, the piston 37 under these conditions being capable of a large variety of forms. The larger the volume of liquid contained in the chamber 22 outside the pipe section 21, the nearer will be the approach to the organ pipe conditions. This volume need not be extremely large, however, for satisfactory operation of the apparatus.

Upon termination of the treatment in the chamber 27, the plug 28 is removed and the bodies withdrawn from said chamber by syphoning them off through the opening in the cap 25 into a collecting vessel. With the valve 32 in closed position, the valve 35 may then be opened to permit the bodies in the conduit 34 to run into the chamber 27 from which they are syphoned off and poured back into the chamber 29.

The apparatus illustrated in Fig. 1 has been found particularly suitable to produce suspensions of matter of specific gravity higher than the outer liquid phase, as, for example, suspensions of water in oil. For producing suspensions of matter of specific gravity less than the outer liquid phase, as, for example, suspensions of oil in water, the apparatus is preferably modified as indicated in Fig. 2. Instead of the section 24, the pipe assembly comprises two elbow sections 55 and 56 forming an inverted U and holding the flexible diaphragm 26 between their secured ends. Section 55 is secured at its lower end to the section 21 and a screw-threaded cap 57 closes the lower end of the section 56, the latter forming with the diaphragm 26 and the cap 57 the chamber 59 wherein treatment is effected. The valve 35 to which the conduit 34 leading from the agitating chamber 29 is connected, communicates with the treating chamber 59. The sections 55 and 56 are respectively provided with upper bosses 60 and 61, through which screw-threaded openings are formed communicating with said sections, and into said openings plugs or machine screws 62 and 64 are respectively removably fitted. The opening formed through the boss 31 provides a means for introducing liquid into the sections 21 and 55 subsequent to assembly of the various sections. The agitated bodies are introduced into the treating chamber 59 in the same manner as described in connection with the apparatus of Fig. 1, the chamber 59 being completely filled, the plug 64 replaced and the valve 35 closed. Treatment of the bodies in the chamber 59 also takes place in the same manner, it being understood that the same system of drive may be utilized to set the column of liquid in motion at its natural period of vibration and hence create the required variation of pressure in the chamber 59. As before, the treated bodies may be removed through the opening formed through the boss 61.

It is desired to have it understood that the invention is not limited to the use of a pipe closed at one end. Referring to Fig. 3, for example, the treatment is carried out in a chamber 65 centrally located in the lower portion of a U-shaped pipe 66 open at both ends, the operation of the liquid column in such a pipe being correspondingly analogous to the operation of an organ pipe open at both ends and its natural frequency being substantially twice that of a liquid column of the same length used in a pipe closed at one end. Here a region of high velocity exists contiguous to each open end of the pipe 66, while at the central portion, where treatment is effected, a high fluctuating pressure is developed. For such apparatus, two flexible diaphragms 67 and 69 are provided, one at either end of the treating chamber. The liquid may be set in motion, at its natural period of vibration, by any suitable means, the same system of drive as previously described being illustrated at the pipe end 71. At its other end, 72, the pipe 66 may terminate in a chamber 74 which is also filled, or partially filled, with liquid, which creates a condition at the latter end approximately the same as that of an organ pipe terminating in an infinite medium. If static pressure is employed, it should be the same at both ends of the pipe 66. For moderate pressures, the pressure at the end 72 may be provided hydrostatically by the liquid in the chamber 74. However, if high pressures are to be employed, hydrostatic pressure at the pipe end 72 would require an extremely high chamber 74. For such pressures, therefore, air pressure is preferably supplied to the chamber 74, for which purpose a nipple 75 extending into said chamber and an exterior valve 76 connected thereto are provided. As shown, the chamber 74 is also provided with a hydrostatic pressure-gage 76. The bodies may be introduced into and withdrawn from the treating chamber 65 through a screw-threaded opening formed through an upper boss 77, a plug or machine screw 78 being removably fitted therein. The bodies should be introduced in a state of preliminary admixture.

The period of time required for effecting disintegration in either of the apparatus embodiments which have been described depends on such factors as the nature of the bodies treated, the amount of inner phase to be dispersed and the contemplated stability of the dispersion. Thus, a period of, say, 5 to 15 minutes may be found sufficient for some suspensions, while a period of 1 hour or more may be required for others.

In the case of suspensions comprising liquid matter as their inner phase, they should be permitted to stand for a predetermined period of time during which all inner matter which has not been comminuted to colloidal size by the treatment will settle out either as an upper or lower layer, depending upon its specific gravity relatively to the outer liquid. If desired, however, the suspensions may be centrifuged to separate out the untreated matter directly.

The colloidal solutions of oil in water obtained by the apparatus which has been described, may be further concentrated by distillation under reduced pressure.

It is understood that the invention is not limited to the specific embodiments illustrated and described herein, also that these embodiments are subject to various modifications without departing from the spirit of the invention.

What is claimed is:

1. An apparatus for dispersing matter in an outer liquid, comprising a pipe closed at one end and open at the other, a flexible partition in said pipe, the bodies to undergo treatment filling the pipe portion between the partition and the closed end and liquid filling the remaining portion, and means for setting the column formed by said bodies and liquid in the pipe into vibratory motion at its natural period of vibration.

2. An apparatus for dispersing matter in an outer liquid, comprising a pipe closed at one end and open at the other, a flexible partition in said pipe, the bodies to undergo treatment filling the pipe portion between the partition and the closed end and liquid filling the remaining portion, means for applying steady pressure at the open end of the pipe, and means for setting the column formed by said bodies and liquid in the pipe into vibratory motion at its natural period of vibration.

3. An apparatus for dispersing matter in an outer liquid, comprising a pipe closed at one end and open at the other, a flexible partition in said pipe, the bodies to undergo treatment filling the pipe portion between the partition and the closed end and liquid filling the remaining portion, a movable member at the open end of the pipe, and means for oscillating said member at a frequency corresponding to the natural frequency of vibration of the column formed by said bodies and liquid in the pipe.

4. An apparatus for dispersing matter in an outer liquid, comprising a pipe closed at one end and open at the other, a flexible partition in said pipe, the bodies to undergo treatment filling the pipe portion between the partition and the closed end and liquid filling the remaining portion, a chamber adapted to have pressure supplied thereto and with which said pipe communicates at its open end, and means in part disposed in said chamber for setting the column formed by said bodies and liquid into vibratory motion at its natural period of vibration.

5. An apparatus for dispersing matter in an outer liquid, comprising a U-shaped pipe closed at one end and open at the other, a flexible partition in said pipe, the bodies to undergo treatment filling the pipe portion between the partition and the closed end and liquid filling the remaining portion, and means including a movable member at the open end of the pipe for setting the column formed by said bodies and liquid in the pipe into vibratory motion at its natural period of vibration.

6. An apparatus for dispersing matter in an outer liquid, comprising a U-shaped pipe open at both ends, two flexible partitions in said pipe respectively removed from its ends, the bodies to undergo treatment filling the pipe portion between the partitions and liquid filling the remaining portions, and means for setting the column formed by said bodies and liquid in the pipe into vibratory motion at its natural period of vibration.

7. An apparatus for dispersing matter in an outer liquid, comprising a U-shaped pipe open at both ends, two flexible partitions in said pipe respectively removed from its ends, the bodies to undergo treatment filling the pipe portion between the partitions and liquid filling the remaining portions, means for applying steady pressure at both ends of the pipe, and means for setting the column formed by said bodies and liquid in the pipe into vibratory motion at its natural period of vibration.

8. An apparatus for dispersing matter in an outer liquid, comprising a U-shaped pipe open at both ends, two flexible partitions in said pipe respectively removed from its ends, the bodies to undergo treatment filling the pipe portion between the partitions and liquid filling the remaining portions, a chamber with which said pipe communicates at one end, said chamber being filled at least in part with liquid, and means including a plunger at the other end for setting the column formed by the bodies and liquid in said pipe into vibratory motion at its natural period of vibration.

9. An apparatus for dispersing matter in an outer liquid, comprising a U-shaped pipe open at both ends, two flexible partitions in said pipe respectively removed from its ends, the bodies to undergo treatment filling the pipe portion between the partitions and liquid filling the remaining portions, chambers adapted to have pressure supplied thereto and with which said pipe respectively communicates at its ends, the chamber at one end being at least in part filled with liquid, and means including a plunger at the other end for setting the column formed by the bodies and liquid in said pipe into vibratory motion at its natural period of vibration.

10. An apparatus for dispersing matter in an outer liquid, comprising a U-shaped pipe terminating in an inverted U-shaped portion and closed at the end contiguous to said portion, a flexible partition in said inverted U-shaped portion, the bodies to undergo treatment filling the pipe portion between the partition and the closed end and liquid filling the remaining portion, and means for setting the column formed by said bodies and liquid in said pipe into vibratory motion at its natural period of vibration.

11. An apparatus for dispersing matter in an outer liquid, comprising a pipe open at at least one end and having a predetermined portion closed at both ends and at least one end by flexible partition means, said predetermined portion being filled with the bodies to undergo treatment and said pipe being otherwise filled with liquid from which said bodies are separated by said flexible partition means, means for setting the column formed by said bodies and liquid in the pipe into vibratory motion at its natural period of vibration, said predetermined portion being located to cause said bodies to be subjected to the fluctuating pressure resulting from said vibratory motion, and means for introducing said bodies into said predetermined portion and for withdrawing them therefrom.

SAMUEL JOSEPH WYNN.